United States Patent Office 2,844,211
Patented July 22, 1958

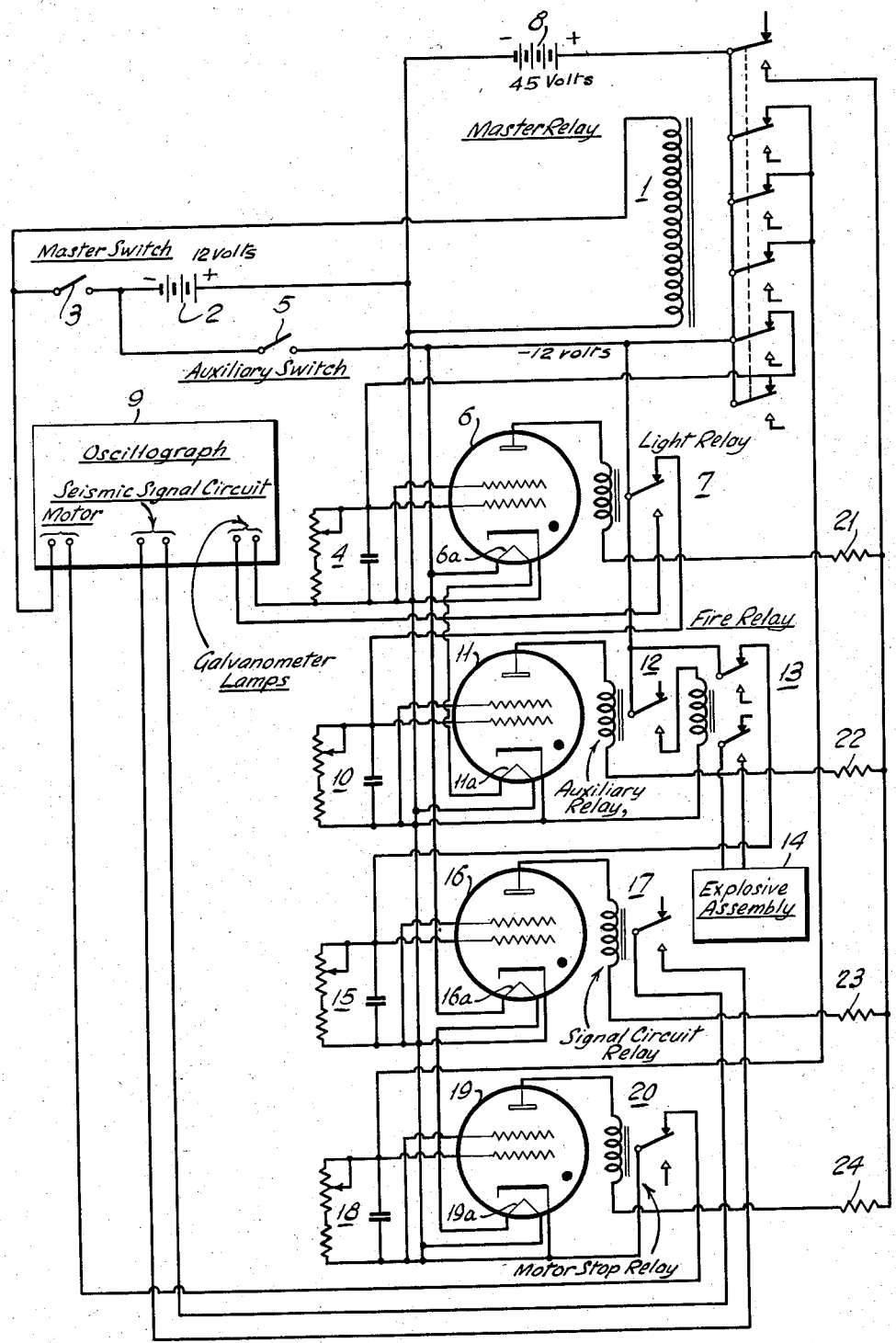

2,844,211
ELECTRONIC AUTOMATIC SEQUENCE TIMERS

Thomas D. Nickerson, Bellaire, Tex., assignor to The Texas Company, New York, N. Y., a corporation of Delaware Application August 25, 1955, Serial No. 530,544

3 Claims. (Cl. 181—.5)

This invention relates to seismic surveying apparatus and more particularly to an electronic automatic sequence timer for controlling certain events of a seismic operation.

Apparatus generally used in seismic surveying includes an explosive assembly for creating seismic waves which are transmitted through the earth's formations, one or more detectors which are set on the earth's surface to detect the seismic waves and to transform them into corresponding electrical seismic signals and a recording mechanism, for example, an oscillograph, for producing a permanent record of the seismic signals. The recording mechanism generally includes a recording medium, e. g., photographic film, which is driven by a motor, and a galvanometric device, which is responsive to the seismic signals and which includes one or more coils each having a mirror attached thereto and associated lamps, for recording the seismic signals on the recording medium. The recording mechanism may also include mixing circuits to mix the seismic signals from two or more detectors prior to recording to produce more intelligible traces on the recording medium and means for decreasing the amplitude of the incoming seismic signals during the actual firing in order to prevent overloading the apparatus. Means for decreasing the amplitude of the incoming signals may, for example, include an amplifier having a gain control device or an appropriate shunt connected across the input of the recording mechanism.

When a given area of land is being surveyed the explosive assembly is used to create seismic waves at each of a large number of predetermined shotpoints which are spaced apart in lines at regular intervals. A record of the seismic waves emanating from each shotpoint is recorded on a separate strip of the photographic film and thereafter a cross section of the earth's structural formations is plotted along the lines. By combining the information from several lines a contour map may be drawn which shows the elevation of the geological formations. This survey is made in the hope of revealing formations which are favorable for the accumulation of oil. As can be readily seen a large number of records each of which must be clearly identified, e. g., as to location of shotpoint, are needed to produce sufficient information to draw a contour map. In order to identify each record, a portion of each photographic strip is used for recording a title which may include not only the geographical location of the shot but also the date, the charge size, etc. One of the easiest ways to record a title on the seismic record is to merely stamp the title onto the record. However, if no means are provided to render a portion of the strip of photographic paper unexposed, trace lines will pass through the title making it difficult to read the information which it contains. Another way to record the title on the seismic record is to paste a title label over a portion of the trace lines which do not contain useful information. This latter method provides a title which is easy to read but adds undesirable bulk to the records.

Since the seismic record is a continuous trace starting from approximately the instant a shot is fired and continuing for an interval of time long enough to record all intelligible signals emanating from the shotpoint, the title or a title block can be conveniently placed either at the beginning of the strip prior to the point of the trace which indicates the instant at which the shot was fired or at the end of the strip after all intelligible or desired signals have been received. However, in seismic surveying practice, it is customary to place the title block at the beginning of the strip.

In a seismic surveying operation, it is generally desired to have certain events occur in a given sequence and for a given interval of time at each shotpoint. After providing space on the photographic strip for a title block, a charge is detonated at the shotpoint, strong primary waves are transmitted through the earth, detected and recorded, and then reflected waves from the subsurface formations are detected and recorded. It is often desirable to protect the oscillograph from the strong primary waves by decreasing the amplitude of these waves at the seismic signal input to the oscillograph and to mix the reflected seismic signals received from two or more detectors to produce a clear trace on the photographic strip.

It is an object of this invention to provide apparatus for automatically controlling certain events of a seismic surveying operation.

It is also an object of this invention to electronically control certain events of a seismic surveying operation.

A further object of this invention is to automatically control by electronic means the firing and recording apparatus used in a seismic surveying operation.

A still further object of this invention is to produce seismic records which are clear, uniform and of a standardized length for convenience in handling and storing same.

For other objects and for a better understanding of the invention reference may be had to the drawing in which the single figure is a schematic diagram, partly in block form, of one embodiment of the invention.

In accordance with this invention an electronic automatic sequence timer is provided to automatically cause certain events of a seismic surveying operation to occur in a given sequence and for a predetermined interval of time.

Referring to the figure in more detail, a master relay 1 has its energizing winding connected across a 12-volt battery 2 via a master switch 3. A resistor-capacitor circuit 4 is connected across the 12-volt battery 2 via contacts of master relay 1 and an auxiliary switch 5. The resistor-capacitor circuit 4 is also connected between the control grid and the cathode of a discharge device having an ionizable medium, for example, a thyratron 6. The anode of thyratron 6 is connected through the energizing winding of light relay 7 and the contacts of master relay 1 to a positive terminal of a 45-volt battery 8 which has its negative terminal connected to the positive terminal of the 12-volt battery 2.

Contacts of the light relay 7 and the auxiliary switch 5 connect the 12-volt battery 2 across galvanometer lamps of an oscillograph 9, which may be one of a number of well-known types. A common type of oscillograph used in seismic operations includes a reel of photographic film which is unreeled by a motor upon demand and a seismic signal circuit which may include a galvanometric device having mirrors adapted to be responsive to the seismic signals received from detectors or geophones and lamps positioned to reflect a beam of light from each of the mirrors onto the photographic film. In addition, the signal circuit may include an amplifier having a gain control device or a shunt disposed across the input to the galvanometric device during actual firing in order to prevent overloading the galvanometric device. Mixing circuits may also be included in the signal circuit to produce a clearer seismic signal by mixing the signals derived from two or more detectors.

A resistor-capacitor circuit 10 is connected across the 12-volt battery 2 via contacts of light relay 7 and auxiliary switch 5. Furthermore, resistor-capacitor circuit 10 is connected between the control grid and the cathode of a discharge device, for example a thyratron 11. The anode of the thyratron 11 is connected to the positive terminal of the 45-volt battery 8 via the energizing winding of auxiliary relay 12 and contacts of master relay 1. The energizing winding of fire relay 13 is connected across the 12-volt battery 2 via contacts of the auxiliary relay 12 and auxiliary switch 5. An explosive assembly 14 is connected to the contacts of fire relay 13. A resistor-capacitor circuit 15 is connected across the 12-volt battery 2 via contacts of fire relay 13 and auxiliary switch 5. The resistor-capacitor circuit 15 is also connected between the control grid and the cathode of a discharge device, for example, a thyratron 16. The anode of thyratron 16 is connected via the energizing winding of a signal circuit relay 17 and the contacts of master relay 1 to the positive terminal of the 45-volt battery 8. The seismic signal circuit of the oscillograph 9 is connected to contacts of the signal circuit relay 17. A resistor-capacitor circuit 18 is connected across the 12-volt battery 2 via the contacts of the master relay 1 and auxiliary switch 5. The resistor-capacitor circuit 18 is also connected between the control grid and the cathode of a discharge device, for example, a thyratron 19. The anode of the thyratron 19 is connected via the energizing winding of a motor stop relay 20 and the contacts of master relay 1 to the positive terminal of the 45-volt battery 8. The motor of the oscillograph 9 is connected across the 12-volt battery 2 via contacts of motor stop relay 20 and master switch 3. Filaments 6a, 11a, 16a and 19a of thyratrons 6, 11, 16 and 19 respectively are connected to the 12-volt battery 2 via the auxiliary switch 5. Resistors 21, 22, 23 and 24 may be included in the anode circuits of thyratrons 6, 11, 16 and 19, respectively, to limit the current passing through these discharge devices.

In the operation of the embodiment of the invention illustrated in the figure, auxiliary switch 5 is closed to heat filaments 6a, 11a, 16a and 19a of thyratrons 6, 11, 16 and 19 respectively and to apply a negative voltage via the contacts of master relay 1 to the control grids of the thyratrons 6, 11, 16 and 19, which voltage also charges the capacitors of the resistor-capacitor circuits 4, 10, 15 and 18. This negative voltage at the control grids of the thyratrons 6, 11, 16 and 19 maintains these thyratrons in a non-conducting condition for a period of time, depending upon the values of the resistor and capacitor of the associated resistor-capacitor circuit, after the respectiveg rid is disconnected from the negative terminal of the 12-volt battery 2. After the auxiliary switch 5 has been closed for a period of time sufficient to heat the filaments of the thyratrons 6, 11, 16 and 19 to an operating temperature and to charge the capacitors of the resistor-capacitor circuits 4, 10, 15 and 18 to a predetermined value, the master switch 3 may be closed to begin a sequence or cycle of the seismic operation. When the master switch 3 is closed the motor of the oscillograph 9 becomes energized and drives a strip of photographic film upon which the seismic signals are to be recorded in time-spaced relation. Furthermore, when the master switch 3 is closed the galvanometer lamps of the oscillograph 9 are extinguished or dimmed to an intensity below the threshold value for exposing the film, also, the master relay 1 becomes energized and is placed in its operative condition. When the master relay 1 is in its operative condition the contacts of the master relay 1 disconnect the control grids of the thyratrons 6 and 19 and the capacitors of the resistor-capacitor circuits 4 and 18 from the 12-volt battery 2 and connect the anode of each of the thyratrons 6, 11, 16 and 19 to the positive terminal of the 45-volt battery 8. As is well known, when the negative potential from the 12-volt battery 2 is disconnected from each of the capacitors of the resistor-capacitor circuits these capacitors discharge through the associated resistors of the respective resistor-capacitor circuits. The values of the resistors and capacitors of the resistor-capacitor circuits will govern the rate of discharge and hence the voltage across the capacitors at any given instant. As soon as the voltage across the capacitor of the resistor-capacitor circuit 4 is decreased to a predetermined value, thyratron 6 discharges and energizes the winding of light relay 7 which actuates its contacts to disconnect the control grid of thyratron 11 and the resistor-capacitor circuit 10 from the 12-volt battery 2 and to connect the galvanometer lamps of the oscillograph 9 across the 12-volt battery 2 to fully illuminate these lamps. It can readily be seen that the time interval between the closing of master switch 1 and the discharge of thyratron 6, which is the time interval during which the motor is unreeling unexposed film for the title block of the seismic record, can be controlled by varying the value of the capacitor of the resistor-capacitor circuit 4 or by varying the value of a resistor of the resistor-capacitor circuit 4, as shown in the drawing, or, if desired, by varying both the resistor and the capacitor of the resistor-capacitor circuit 4. After the light relay 7 disconnects the control grid of thyratron 11 and the resistor-capacitor circuit 10 from the 12-volt battery 2, the capacitor of the resistor-capacitor circuit 10 discharges in a manner similar to that described with regard to the capacitor of resistor-capacitor circuit 4. Thus, the thyratron 11 discharges at a predetermined instant after the discharge of thyratron 6, depending upon the values of the resistor and capacitor of resistor-capacitor circuit 10. Current through the discharging thyratron 11 energizes the auxiliary relay 12 which then connects the winding of the fire relay 13 across the 12-volt battery 2. When the fire relay 13 operates, the negative potential from the negative terminal of the 12-volt battery 2 is disconnected from the resistor-capacitor circuit 15 and the circuit of the explosive assembly 14 is closed to fire an explosive charge of the explosive assembly 14 which creates the seismic waves in the earth's formations. As shown in the figure, the auxiliary relay 12 is connected so as to operate the fire relay 13, however, these two relays may be replaced by a single relay of proper design, if desired. A predetermined time after the discharge of the explosive charge, the capacitor of the resistor-capacitor circuit 15 discharges in the manner described above in connection with the capacitors of the resistor-capacitor circuits 4 and 10 to discharge thyratron 16. The winding of the signal circuit relay 17 is then energized and the contacts of this relay close to effect desired changes in the seismic signal circuit of the oscillograph 9, for example, to increase the amplitude of the seismic signal at the oscillograph, which had been partially suppressed during the arrival of the strong primary waves to prevent overloading the apparatus, and to connect mixing circuits into the seismic signal circuit to mix signals from two or more detectors. The resistor-capacitor circuit 18 which is disconnected from the 12-volt battery 2 at the instant the master relay 1 is placed in its operative condition has a time constant sufficiently large to maintain the thyratron 19 in its inoperative condition until after thyratron 16 has been discharged and until after a suitable length of seismic record has been recorded. When the thyratron 19 discharges, the motor stop relay 20 becomes energized and the contacts of this relay 20 open to disconnect the motor from the 12-volt battery 2 to terminate the cycle of operation which has produced a seismic record or seismogram at a given shotpoint. By merely opening the master switch 3 for a short interval of time the apparatus is reset for another cycle of operation.

From the above description it can be seen that in accordance with this invention the electronic sequence timer automatically controls certain events of a seismic operation, including the following: (1) operates the oscillograph motor, without the oscillograph lights being on, for an interval of time sufficient to unreel a desired length of unexposed photographic film whereon a title containing data identifying the seismic record may later be added; (2) switches on the galvanometer lamps; (3) fires the explosive charge; (4) effects desired adjustments in the input of the seismic signal circuit of the oscillograph; and (5) stops the oscillograph motor after the seismic signal is recorded.

In the event of a misfire, or for any other reason, the sequence may be interrupted at any point in the cycle merely by opening the main switch 3 which returns the apparatus to its starting position. Then a new cycle may be started merely by again closing the master switch 3.

After closing master switch 3 to start a cycle of operation the interval of time during the unreeling of a length of unexposed film is controlled by the time constant, i. e., by the value of the resistor and capacitor, of the resistor-capacitor-circuit 4. The interval of time between the instant at which the lights go on, i. e., at the end of the length of unexposed film, and the instant at which the explosive charge is fired is controlled by the time constant of the resistor-capacitor circuit 10. The interval of time between the instant at which the explosive charge is fired and the instant at which desired adjustments in the seismic signal circuit are effected is controlled by the time constant of the resistor-capacitor circuit 15. The instant at which the oscillograph motor is turned off, which terminates a sequence of cycle of seismic operation, is determined by the time constant of the resistor-capacitor circuit 18, this time constant being equal to the duration of a cycle of operation. As illustrated in the figure the time constants of each of the resistor-capacitor circuits 4, 10, 15 and 18 may be varied merely by varying the value of the variable resistor of the respective resistor-capacitor circuit. The minimum and maximum time constants or settings of the resistor-capacitor circuits 4, 10, 15 and 18 may be, for example, 0.3–0.6 second for resistor-capacitor circuit 4, 0.04–0.11 second for resistor-capacitor circuit 10, 0.15–0.46 second for resistor-capacitor circuit 15, and 3–6 seconds for resistor-capacitor circuit 18.

In accordance with this invention the light, fire, and signal circuit relays are operated in a sequence by the series of time delay means which include the resistor-capacitor circuits 4, 10, and 15 respectively, whereas the motor stop relay is operated independently of this series or chain by the time delay means which include the resistor-capacitor circuit 18. The operation of the time delay means of the chain and the time delay means of the motor stop relay is simultaneously initiated at the instant when the master relay 1 is placed in its operative condition. Therefor, the motor stop relay 20 acts independently of the chain of relays 7, 13 and 17 so that the sequence timer will be turned off after a time interval determined by the time constant of resistor-capacitor circuit 18 even if one of the relays in the chain fails to function.

After the seismic signals have been recorded on the photographic film and the cycle of the seismic operation is completed, the title block may be either stamped or photographically printed on the unexposed portion of the record. It has been found convenient to print the title block photographically after recording the seismic signals but before the photographic film is developed.

It should be understood that the present invention is not limited to the embodiment described above and that changes and modifications may occur to those skilled in the art without departing from the spirit and scope of the present invention. Furthermore, although the sequence timer has been described in conjunction with an oscillograph employing a photographic film as a recording medium, the timer may be used also in conjunction with a magnetic tape recorder. Therefore, only such limitations should be imposed as are indicated in the appended claims.

I claim:
1. Seismic surveying apparatus comprising an oscillograph including galvanometer lamps and a seismic signal circuit, an explosive assembly and an electronic sequence timer comprising a series of delay means and a plurality of switching means, each of said switching means being coupled to a different delay means and to a succeeding delay means of said series, said different delay means rendering said each switching means operative at a predetermined time, said succeeding delay means being responsive to said each switching means, said galvanometer lamps, said seismic signal circuit and said explosive assembly each being responsive to a different one of said plurality of said switching means.

2. Seismic surveying apparatus as set forth in claim 1 wherein each of said delay means includes a resistor-capacitor circuit and wherein each of said switching means includes a discharge device having an ionizable medium and a relay connected to the output of said discharge device, said resistor-capacitor circuit being connected to the input of said discharge device.

3. Seismic surveying apparatus comprising an oscillograph including a motor, galvanometer lamps and a seismic signal circuit, an explosive assembly, an electronic sequence timer comprising a series of delay means and a plurality of switching means, each of said switching means being coupled to a different delay means and to a succeeding delay means of said series, said different delay means rendering said each switching means operative at a predetermined time, said succeeding delay means being responsive to said each switching means, said galvanometer lamps, said seismic signal circuit and said explosive assembly each being responsive to a different one of said plurality of switching means, additional delay means, means for simultaneously initiating the operation of said series of delay means, said additional delay means and said motor, and additional switching means coupled to said additional delay means and to said motor, said additional delay means being adapted to render said additional switching means operative at a predetermined time to interrupt the operation of said motor.

References Cited in the file of this patent
UNITED STATES PATENTS

| | | |
|---|---|---|
| 2,639,361 | Hartwig et al. | May 19, 1953 |
| 2,679,598 | Wright et al. | May 25, 1954 |

UNITED STATES PATENT OFFICE

CERTIFICATE OF CORRECTION

Patent No. 2,844,211                                          July 22, 1958

Thomas D. Nickerson

It is hereby certified that error appears in the above numbered patent requiring correction and that the said Letters Patent should read as corrected below.

In the drawing, strike out "the circuit connection between the uppermost movable contact arm of the master relay 1 and the next to the uppermost movable contact arm of the same master relay 1"; column 3, line 54, for "thyratrons 6, 11, 16 and 19," read -- thyratrons 6, and 19, and via the contacts of light relay 7 and fire relay 13 to the control grids of thyratrons 11 and 16 respectively, --.

Signed and sealed this 8th day of December 1959.

(SEAL)
Attest:

KARL H. AXLINE                                                        ROBERT C. WATSON
Attesting Officer                                                 Commissioner of Patents